United States Patent Office 3,261,894
Patented July 19, 1966

3,261,894
METHOD OF MANUFACTURING FOAMED SILICATE STRUCTURES
Alois Seidl, Lower Bavaria, Germany, assignor to Wasag-Chemie Aktiengesellschaft, Essen, Germany
No Drawing. Filed Aug. 15, 1962, Ser. No. 216,978
Claims priority, application Germany, Sept. 12, 1961, W 30,680; Sept. 21, 1961, W 30,738; May 19, 1962, W 32,246
The portion of the term of the patent subsequent to May 18, 1982, has been disclaimed
5 Claims. (Cl. 264—43)

This invention relates to a method for making foamed silicate structures from fibrous inorganic silicates and alkali silicates, with or without various preferred auxiliary agents. In addition, particular embodiments of this invention yield foamed structures having exceptionally high compressive impact and transverse bending strengths and/or high surface hardness. These foamed structures are fire-resistant, water-resistant and possess excellent thermal and acoustical properties as well as being very amenable to mechanical forming operations.

This application is a continuation-in-part of copending application 68,637 filed November 14, 1960.

Ever since 1883 when the first United States patent was issued relating to expanded silicates as thermal insulators for a fireproof safe, there has been a continual but sporadic interest in the utilization of expanded silicates for a variety of purposes. For example, it has been suggested in the prior art to fabricate thermal insulation by concentrating alkali silicates and then heating them in such a manner that an intumescence of the silicate is obtained due to rapid evaporation of the water. This process, though leading to intumescent material, does not result in a mass which is sufficiently firm or rigid for general usage. To overcome this disadvantage, it has been further suggested in the prior art to add such porous fillers as quartz, magnesia, mica and asbestos to improve the mechanical properties of the mass. Furthermore, it has been suggested to add gas evolving substances, such as potassium chlorate, to increase the number and size of the pores in the foamed mass. In all of these methods, however, there is necessitated a complicated preparation of the solutions which can be used as raw materials.

It is also known that it is possible to obtain relatively firm intumescent masses by treating mixtures which are not completely dissolved. In this way not only is the final product made mechanically superior, but the technology of the method steps is simplified. However, if this expedient is taken, there are other serious disadvantages in that the resistance to water and humidity and the high temperature mechanical properties are decreased to such a value that the final product still remains unsatisfactory for a wide variety of uses.

Still another suggestion found in the prior art incorporates aged gels of sphere-shaped silicates for binding fibrous silicates into a coherent mass. This method, though requiring a complicated pretreatment of all the materials used, does not lead to a technically superior product. That is to say, the product of this process does not possess in combination, low weight, good mechanical properties, excellent thermal and acoustical properties and resistance to humidity.

The object of the present invention, therefore, is to obviate the shortcomings and disadvantages of the prior art product by providing new molded foamed structures having excellent thermal, acoustical, and mechanical and weathering properties.

Another object is to provide a relatively simple method for the manufacture of these novel foamed structures.

Still another object is to provide a novel foamed structure having porosities of different diameters.

A further object is to provide molded foamed structures having reinforcing members inserted therein.

A still further object is to provide laminates of these molded structures with other materials, such as glass, or plastics or metals.

An additional object is molded foamed structures which are coated in such a way as to provide a high surface hardness, and/or to provide a smooth, attractive surface finish which can reduce, if not eliminate, any need for a subsequent plastering step.

Still an additional object is to provide metal-impregnated foamed silicate structures which exhibit particularly high strengths.

Upon further study of the specification and appended claims, other objects and advantages of the present invention will become apparent.

To achieve the objects of the present invention, it is necessary to produce the molded foamed shapes in the following basic manner:

Firstly, a solution is formulated by dissolving in parts by weight, about one part alkali metal silicate, about 0.02 to 0.7 parts of an inorganic fibrous silicate in about 2 to 10 of water. Secondly, this solution is heated to about 140–360° C. to drive off any free water phase, thereby resulting in a substantially dried mass having about 10–15% chemically combined water in the matrix. Thirdly, it is necessary to comminute the dried mass to obtain particles of 0.001–10 mm., said resultant particles being hereinafter designated as the "intermediate product." Fourthly, the intermediate product is placed in a mold and heated to 700–900° C. for a sufficient time to obtain a viscous foamed structure having the desired porosities and cell wall thicknesses. Lastly, the foamed structure is cooled to below its softening temperature, thereby obtaining a rigid structure having excellent thermal, acoustical, mechanical and weathering properties.

With respect to the first step, it is to be understood that the fibrous inorganic silicate encompasses those silicates which are found either naturally in the fibrous state, or can be converted to the fibrous state by mechanical procedures. Examples of inorganic fibrous silicates include glass wool, basalt wool, rock wool, and asbestos wool.

Further in connection with the first step, it is to be noted that the alkali metal silicate includes sodium, potassium, and lithium silicates, but it is preferred to use the sodium silicate, particularly a commercial solution thereof. It is also to be noted that whereas it is possible to maintain a ratio of the alkali metal silicate to fibrous silicate to water of about 1 to 0.02 to 10 in parts by weight, it is preferably to maintain the ratio at about 1 to 0.15 to 5, and for even better results from 1 to 0.3 to 4. Parenthetically, it is apparent also that higher amounts of water can be used, inasmuch as the free water is evaporated in the next step.

In addition to the alkali metal silicate, fibrous silicate and water, it is also advantageous to add minor quantities of alkaline earth carbonates and the like to the preliminary product in order to reduce the surface tension of the mass when it is heated in the final step to above 700° C. By virtue of this surface tension reducing agent, pores with thinner walls can be formed, thereby resulting in foamed structures having lower densities in the range of about 0.25 g. per cubic centimeter. The preferred species and quantity of this surface tension reducing agent is 0.1–3% calcium carbonate by weight of the first mixture.

Alternatively, it is also possible to decrease the densities of the final products by employing blowing agents, inorganic or organic. For example, inorganic sulfates such as zinc sulfate or aluminum sulfate, when admixed to the preliminary product in a ratio of 0.05 parts by weight blowing agent per 100 parts by weight preliminary product, it is possible to obtain densities of about 0.20–0.15 g./cm.$^3$.

Even lower densities can be obtained by the addition of organic water soluble materials to the alkali silicate solutions, which solutions in general, contain residual sulfates from their production from sand and sodium sulfate. The function of these organic water soluble agents is to provide carbon to reduce the sulfate to hydrogen sulfide gas, which in turn swells the viscous mass, thereby producing a more porous material.

In view of the fact that the molding process takes place at over 700° C., and further because water soluble organic compounds are generally decomposed into their elements at such high temperatures, it is apparent that any water soluble substance will function in this reaction. Of the innumerable possible water soluble organic compounds that can be employed, particular success has been achieved with sugar, molasses, glycerine and ethylene glycol.

These water soluble substances are preferably admixed to the alkali silicate solutions in such concentrations that the carbon introduced amounts to about 0.01–2%, even more preferably 0.05–0.5%. The properties of the final product of this employment of the invention are excellent, in that the densities are in the order of 0.05–0.15 g./cm.$^3$. Surprisingly, with these low densities the compressive strength of the material remains quite high, for example, a substance with a density of 0.1 g./cm.$^3$ exhibits compressive strengths of about 3–10 kg./cm.$^2$. Consequently, low density, strong heat insulators can be beneficially obtained by the instant process.

It is also advantageous for some final uses to add pulverized stone-like silicates to this initial mixture. These stones, like pumice stone, having a particle size of 1–3 mm. are not completely dissolved in the alkali silicate solution and consequently, the cooling time in the final step is thereby shortened. In the event that these stones are used, it is desirable to use a sufficient quantity of them so that the final structure contains them in distances not exceeding about 10 mm., but at the same time, it is preferable not to use more than about 5% by weight of the total mixture.

If the final product is to be used for decorative purposes, it is also possible to add to the initial solution, about 0.01–1% by weight of the mixture one or more color-yielding salts, such as cobalt sulfate, potassium chromate, cadmium sulfide, copper and iron salts. By mixing several different salts with the initial silicate mixture, there is produced in the ultimate product an attractive variegated color pattern.

With respect to the second step, it can be conducted by any conventional method, such as hot air convection or infra-red radiation or high frequency induction, etc. Whereas, in general, it is necessary to heat the mixture to 140–360° C., it is preferred to heat it between 200 to 360° C., and for the best results to about 300° C.

With respect to the comminution step, any particle reduction system or apparatus can be used as long as the final particles are comprised of particle sizes between 0.1–10 mm. This particle reduction step is not only necessary to facilitate the filling of the mold with product, but it is also important with respect to the pore size of the final product. Furthermore, it is preferred to provide a final product having varied pore sizes; consequently, a varied particle size within the aforesaid range is also preferred. For example, excellent foamed structures are obtained from an aggregate having 50% by weight 0.1–1 mm., 40% 1–5 mm. and 10% 5–10 mm.

If it is desired to increase the resistance of the final product to shock, either mechanical or thermal, it is a preferred embodiment of this invention to add various solid materials to the intermediate product before the molding step. In general, the additive can be a metal and/or a metal oxide, and/or a silicious material, said additive being in the form of particulates such as grains or chips, or in the form of shavings or fibers as in household steel wool, for example. Obviously, many diverse materials can be employed, but to maintain a low density in the final product, it is preferred to employ light metals such as aluminum and magnesium, etc., as well as their alloys. These additives are preferably employed in a ratio of about 1–10 parts by weight additive to 100 parts by weight of intermediate product, even more preferably 2–5 parts by weight additive to 100 parts by weight intermediate product.

An even more sophisticated modification of the preceding embodiment comprises the technique of incorporating the solid additives in the surface of the molded body, i.e., the solid additive is distributed uniformly in a thickness of from 1–10 cm. measuring from the surface of the molded body. In this way, the Birnell hardness can be increased to 1–20 times the value of conventional foamed glass, the impact resistance may be increased as much as 2-fold.

If steel wool is employed as the additive, then the transverse bending strength is also increased markedly. Furthermore, by the inclusion of steel wool in a maximum concentration of 20% by weight in the final molded product, the thermal conductivity of the final product is improved to such an extent that upon exposure to thermal shock, the formation of hairline fissures is eliminated.

Still another technique for improving the mechanical strengths of the foamed glass structure of the present invention incorporates the immersion of the intermediate product into a bath of molten metal, which bath is at a temperature up to 900° C. Upon contacting the molten metal, the intermediate product swells and simultaneously is coated with a thin metal film. The bond between the metal and the intermediate product is both physical and chemical inasmuch as it is an oxidic linkage between the metal and the silicate. Of the various metals that can be satisfactorily employed in this embodiment, it is preferred to use light metals such as aluminum and magnesium and their alloys. Furthermore, it is generally desirable to use such temperature conditions that the bath temperature is at least 100° more than the melting temperature of the material in order to avoid solidification by heat losses, etc.

This metal coated intermediate product, therefore, comprises silicate particles of 0.001–10 mm. coated with a metal having a thickness of about 0.001 to 1 mm. By varying the ratio of metal to silicate, it is apparent that final products can be obtained having various characteristics. For example, the electrical as well as mechanical properties of the final product will be substantially dependent upon its metal content.

Still another method for providing the foamed silicate structure with additional mechanical strength involves the incorporation of reinforcing members with the intermediate product. These reinforcing members can be conventional materials such as wire nets and the like.

With respect to the molding step, above 700° C., the mass becomes viscous, and pores which are initially formed have a wall thickness of about 0.1–1 micron. These pores are interconnected by small channels, but upon further heating, larger pores are formed and these channels disappear. The diameter of these larger pores depends upon the temperature and duration of heating. At temperatures between 700° C. and 900° C., the pores first expand, but if heated for an excessive time at these temperatures, the pores contract with an increase in the thickness of the pore walls. In general, the moldable mass is kept at 700–900° C. for 1 to 30 minutes, assuming that the mass is uniformly heated. The preferred time temperature conditions are 770° C. to 820° C. for 8 to 10 minutes.

To accomplish this molding step, it is possible to employ either batch molds, on the one hand, or a continuous conveyor belt system on the other hand. The latter method is conducted by pouring the intermediate product into an endless conveyor belt which passes first through the heating zone and then through the cooling oven. Likewise, it is also possible to pass the batch molds through the heating and cooling zones in a continuous manner.

In many cases, however, it will not be possible to heat the mass uniformly as the thickness of the material will be such as to provide a substantial resistance to heat transfer. Accordingly, it may be necessary to compromise the properties of the exterior side of the piece with the properties of the interior side of the piece. As a matter of fact, for some uses, it is preferred to have a nonuniformly heated piece, as this results in pores which have a wide variation in size. In general, products are obtained having densities of 0.05–0.50 g./cm.$^3$.

It will be simple for one skilled in the art to determine the range of temperature and time conditions for each configuration which is molded. As an example, it is to be noted that a plate 30 mm. thickness attains the desired porosity at 750° C. in ten to 15 minutes.

In molding these foamed structures, it may be necessary to treat the mold to prevent the adherence of the molded object to the mold. This treatment can be accomplished by coating the mold surfaces with a calcium oxide-containing layer.

With respect to the cooling step, it is only necessary to lower the temperature of the mass to below the softening temperature. In this way, when it is extracted from the mold, it will not be subject to deformation. Preferably, it is desired to cool the foamed structure to at least 650° C. The time required to lower the mass to this temperature is variable but, naturally, for the sake of economics, it is preferable that it be accomplished as quickly as possible, the rate of cooling being about 100° C. to 600° C. per hour, within the temperature range of about 400° C. to 650° C.

For the utilization of these foamed structures in the building industry, it is generally sufficient to make the foamed body 20–40 mm. thick. However, it is also possible to produce structures which are 100 mm. thick, and even higher. It is preferable to add reinforcing rods or equivalent reinforcing media so that extra strength is provided especially for these larger structures. Moreover, it is possible to use reinforced foamed structures as beams in the building trade.

In addition to reinforced structures, it is preferred to make laminates of these foamed structures with other materials such as, glass, metal, and plastics. With respect to the metal laminate, it is to be noted that the strain of the metal should be reduced by so-called "temperature cuts" in order to prevent the foamed structure from being loosened from the metal.

With respect to a glass foamed laminate, it is possible to melt a foamed structure onto one or both sides of the glass. This particular type of laminate is advantageous in view of the fact that the adherence between the foam and the glass is established by multiple point contact, and consequently, does not suffer from temperature changes in the same manner as would a surface adhesion. Because of this fact, it is possible to prepare a glass-foam-glass sandwich having two different glasses with different expansion curves. In any event, ordinary window glass has been found to be perfectly suitable.

It is also possible to coat these foamed structures with paint and the like, or apply thereto, other sheets or films of either plastic or inorganic materials. These products can be particularly advantageous in the building industry where decorative effects are desired.

Another particularly advantageous property of the foamed silicates of the present invention is that they can be so treated as to produce walls which require a minimum of plastering. This is accomplished by sintering a layer of glass and sand onto the surface of the molded silicate structure. For this purpose, sand is mixed with glass dust at a ratio of 1:10 to 10:1, the particle size of the ingredients being about up to 2 mm. The sintering step is generally accomplished at 650 to 900° C., preferably 690–750° C.

One of the major advantages of the foamed material of the present invention resides in its resistance to fire. For example, the foamed structure retains its original shape when it is slowly heated to high temperatures, for example, 600° C. in thirty minutes. Moreover, even when jets of high temperature flames are played on the structures, there is no substantial damage, as even those invisible hairline cracks which are formed on the foamed structures devoid of metallic inclusions are subsequently eliminated by melting at higher temperatures, i.e. 700° C. and above. A test with a plate of foamed structure three centimeters thick showed that a fire, having temperatures of about 800° C. on one side will raise the temperature of the other side to only 100° C. after 15 minutes. Consequently, it is apparent that the foamed structures of the present invention have both dimensional stability at high temperatures and a low rate of heat transfer by conduction.

One excellent use of the foamed structures of the present invention is in the building industry where the structures can be utilized as lost casings, i.e., the plate remains as a part of the wall, and thereby offers excellent protection against sound and heat. In this manner, the weight of the partitions can be reduced substantially while maintaining the same heat insulation effectiveness. The heat conductivity of the products of this invention is as low as about 0.045 kcal./m./h./° C. as compared to the value of 0.35–0.5 kcal./m./h./° C. of brick walls. Furthermore, the walls do not have to be finished as the foamed plates have a smooth surface which can be hardened by sintered-on sand. It has been found to be particularly advantageous to line brick walls having a thickness of 10–15 cm. with foam glass plates having a thickness of 3–4 cm. as this combination corresponds to a brick wall having a thickness of 50 cm. It is also apparent that these foam glass plates are ideal for the construction of prefabricated houses.

Another use for these materials is in the roofing trade, wherein these materials can be used as roofing elements. The low density of these materials makes this very amenable both in earthquake areas or in places where building materials have to be transported over an extensive distance. Furthermore, the low heat conductivity of those materials makes them particularly advantageous in both arctic and tropical zones, as well as in temperate zones.

Still another use for these foamed structures is in the manufacture of concrete ceilings. By virtue of the excellent acoustical properties of the foamed silicate, when it is applied as a laminate onto concrete, there is a substantial reduction in the noise level due to walking and talking.

Still other applications can be found for this new product in the construction of ships, airplanes and vehicles, as well as in the construction of cooling and air-conditioning installations. Also, because of the low density of these materials, and the fact that they contain sufficient gas tight pores, they can be used where it is necessary to have water-buoyant material. Finally, the new products of this invention can be shaped into any common structural shape, such as double-T, rectangular, or tubular.

Without further analysis, it is believed that one skilled in the art, can, using the preceding description, utilize the present invention to its fullest extent. The following preferred specific embodiments are, therefore, to be construed as merely illustrative, and not limitative of the remainder of the specification and claims in any way whatsoever.

*Example 1*

150 g. rock wool and 1 liter of aqueous sodium silicate solution (dry solids 310 g.) are mixed with 1 liter of a 3% by weight cobalt sulfate solution. The rock wool is completely dissolved by heating and the solution is then evaporated in an iron vessel for 6 hrs. at 300° C. After cooling, the solid residue is removed and is crushed in a conventional grinder to a grain size of 10 mm. and less. The metal molds coated with a suspension of calcium hydroxide are then filled with the intermediate product, heated to 800° C. for 15 mins. and cooled within 8 hrs.

Example 2

According to the method described in Example 1, 150 g. rock wool and 20 g. pumice are mixed with 1 liter of sodium silicate and 1 liter of water in which 20 g. CaO have been dissolved. After evaporation at 200° C., the material is crushed to a grain size of 5 mm. The glass-like intermediate product is heated to 850° C. for 15 mins. in metal molds coated with $Ca(OH)_2$. After 1½ hrs. cooling period, the porous bodies are easily released from the metal molds.

Example 3

In a manner similar to that described in Example 1, 80 g. glass wool, 1 liter of the silicate solution mentioned in Example 1 and 1 liter of 0.2% by weight aqueous iron chloride solution are evaporated to dryness for 4 hrs. at 250° C. After the intermediate product has been crushed to grain sizes of below 5 mm., it is heated to 790° C. for 10 mins. in molds in which previously a glass plate and a wire net were inserted. The molded body obtained is an excellent wall covering as well as lost casing in building constructions. The transverse bending strength is increased 5 times as compared to the product obtained according to Examples 1 and 2.

Example 4

A plate produced according to Example 3 is covered on one side with a pastel-colored non-inflammable polyvinylchloride film of 0.2 mm. thickness by gluing it on with a rubber base cement. The resulting plate shows a highly decorative effect.

Example 5

A preliminary solution was prepared from 1 liter of alkali silicate solution (32% potassium silicate solution) and 3 g. crystallized sucrose dissolved in 40 cm.³ of water. 150 g. rock wool and 1 liter of this aqueous preliminary solution were thereafter mixed with 0.7 liter of water. The rock wool was completely dissolved by heating, and the solution was then evaporated in an iron vessel for 6 hrs. at 300° C. The solid residue was removed after cooling, and crushed in a conventional grinder to a maximum grain size of 10 mm. The metal molds provided with a facing of basic $MgCO_3$ (magnesia alba) are then partly filled with this crushed intermediate product, heated for 15 mins. to 750° C., and are then slowly cooled within 10 hrs. After cooling, a foamglass-like product was obtained having a density of 0.10 g./cm.³ and a compressive strength of 6 kg./cm.².

Example 6

This example was conducted according to the method of Example 5 except that the preliminary solution was prepared by dissolving 5 g. of glycerine in 1 liter of an aqueous commercial sodium silicate solution (37%). After, with the aid of this preliminary solution, the rock wool was dissolved, the intermediate product prepared and crushed and subsequently heated in the crushed form to approximately 750° C. and cooled again, there was obtained a foamglass structure having a density of 0.08 g./cm.³ and a compressive strength of 5 kg./cm.². The average pore size was approximately 0.1–0.7 mm.

Example 7

1 liter of water glass ($Na_2O:SiO_2=1:3.3$) is diluted with 0.5 liter of water. After 100 g. rock wool have been introduced and dissolved in the boiling, diluted waterglass solution, the mixed silicate thus obtained is evaporated to dryness at temperatures between 140° C. and 360° C. This intermediate product is crushed—maximum grain diameter 10 mm.—and uniformly mixed with 25 g. steel wool. This mixture is then heated in a mold to 760° C. for 13 mins. in the oven. Thereafter, the mold is slowly cooled. These resultant molded structures tolerate shock heating. Also the compressive and transverse bending strengths are twice as high as that of the product obtained according to Example 1.

Example 8

On part of a finely ground intermediate product (500 mesh) produced according to Example 7, is mixed with 2 parts by weight of aluminum shot, placed into a mold, covered with the preliminary product, heated to 740° C., and cooled. After removal from the mold, the molded structure is coated on the one side with a layer of aluminum shot which is bound vitreously. This layer is so hard that a ball of 1 cm. diam. with a load of 10 kg. does not leave a discernable impression.

The products obtained according to the two above-described examples, as compared to molded structures without the addition of metal, exhibit considerably improved compressive and impact strength as well as surface hardness as shown by the following data:

Molded structure according to Example 7: compressive strength=8 kg./cm.²
Molded structure according to Example 8: compressive strength=12 kg./cm.²
Molded structure according to Example 7: Brinell hardness=6 kg./cm.²
Molded structure according to Example 8: Brinell hardness=40 kg./cm.²

Example 9

150 g. rock wool and 1 liter of an aqueous sodium silicate solution (dry substance 310 g.) are mixed with 1 liter of a 0.3% by weight cobalt sulfate solution; the rock wool is completely dissolved by heating and is then evaporated in an iron vessel for 6 hrs. at 300° C. The solid residue is removed after cooling and crushed in a conventional grinder to a maximum grain size of 10 mm.

In a trough with a capacity of 100 liters, 200 kg. of Al metal are heated to 760° C. The crushed intermediate material is immersed once into the molten metal by means of a bucket wheel which fills the trough longitudinally, immerses it to about ⅓ of its height into the metal bath and has a speed of rotation of 1 minute. Upon emerging, the material at a temperature of about 760° C. is inserted into a press and compressed therein for about 1–60 seconds at about 750° C. and a pressure of 0.1–5 atmospheres gauge. The molded body is then removed from the press, brought rapidly to a temperature below the melting point of the metal, and cooled in an oven to about 400° C. within 1–10 hrs., and thereafter more rapidly within 0.5–2 hrs. to room temperature. A metal-impregnated, foamglass-like molded structure is obtained having a weight per unit volume of 0.4 g. per cm.³.

If the time of rotation of the bucket wheel is reduced to 2 mins., the starting materials and other operating conditions being the same, a molded structure results having a weight per unit volume of 0.6 g. per cm.³.

Whereas ceramic and glass-like molded structures burst, on account of their friability, even in response to a relatively small impact energy of 0.1–10 mkg., it is impossible to destroy a molded structure produced according to the above example through formation of cracks. Although an indentation will be left at the point of impact, the structure will not burst, as the metal prevents the propagation of cracks and fissures.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are prop-

What is claimed is:
1. A method of producing a metal coated silicate particle, which method comprises the steps of:
    (a) forming a solution containing in parts by weight, about one part alkali metal silicate, 0.02–0.7 parts of inorganic fibrous silicate, and 2–10 parts water;
    (b) heating said solution to about 140–360° C. to eliminate any free water phase;
    (c) comminuting said dried mixture to obtain particles of 0.1–10 mm.; and
    (d) coating said particles with a layer of molten metal.
2. The process of claim 1 wherein the metal is a light metal selected from the group consisting of aluminum, magnesium and the alloys thereof.
3. A method of producing molded shapes having excellent thermal, mechanical and acoustical properties comprising the steps of:
    (a) forming a solution containing in parts by weight about one part alkali metal silicate, 0.02 to 0.7 parts of inorganic fibrous silicate, and 2 to 10 parts water;
    (b) heating said solution to about 140–360° C. to drive off any free water phase;
    (c) comminuting said dried mixture to obtain an intermediate product having particles of 0.1–10 mm.;
    (d) adding metal particulates to the intermediate product in concentration of 1–10 g. metal per kg. of the total solids;
    (e) heating said intermediate product at 700–900° C. to obtain a foamed structure; and
    (f) cooling the foamed structure to below the softening temperature, thereby obtaining a rigid structure having excellent thermal, acoustical, mechanical and weathering properties.
4. The process of claim 3, further comprising the step of sintering a mixture of glass and sand onto the surface of the foamed rigid silicate structure, thereby yielding a very smooth surface.

5. A method of producing molded shapes having excellent thermal, mechanical and acoustical properties comprising the steps of:
    (a) forming a solution containing in parts by weight about one part alkali metal silicate, 0.02 to 0.7 parts of inorganic fibrous silicate, and 2 to 10 parts of water;
    (b) heating said solution to about 140–360° C. to drive off any free water phase;
    (c) comminuting said dried mixture to obtain an intermediate product having particles of 0.1–10 mm.;
    (d) adding steel wool to the intermediate product in concentration of 1–10 g. steel wool per kg. of the total solids;
    (e) heating said intermediate product at 700–900° C. to obtain a foamed structure; and
    (f) cooling the foamed structure to below the softening temperature, thereby obtaining a rigid structure having excellent thermal, acoustical, mechanical and weathering properties.

References Cited by the Examiner

UNITED STATES PATENTS

| | | | |
|---|---|---|---|
| 1,842,186 | 1/1932 | McBerty | 264—43 |
| 1,896,689 | 2/1933 | Spencer | 161—161 |
| 2,012,798 | 8/1935 | Whittier. | |
| 2,038,034 | 4/1936 | Fowler | 264—42 |
| 2,364,317 | 12/1944 | Schaeter | 264—42 |
| 2,449,458 | 9/1948 | Doyden | 161—160 |
| 2,788,290 | 4/1957 | Deuble | 117—105 XR |
| 2,902,739 | 9/1959 | Foster | 264—62 XR |
| 2,922,721 | 1/1960 | Tarkan et al. | 117—105 XR |
| 3,090,094 | 5/1963 | Schwartzwald et al. | |
| 3,097,930 | 7/1963 | Holland. | |

ROBERT F. WHITE, *Primary Examiner.*

EARL M. BERGERT, ALEXANDER H. BRODMERKEL, *Examiners.*

C. B. COSBY, J. A. FINLAYSON, *Assistant Examiners.*